March 11, 1969     L. S. YAGGY     3,432,717
MOVING TARGET VISUAL INDICATOR TUBE
Filed Feb. 5, 1965
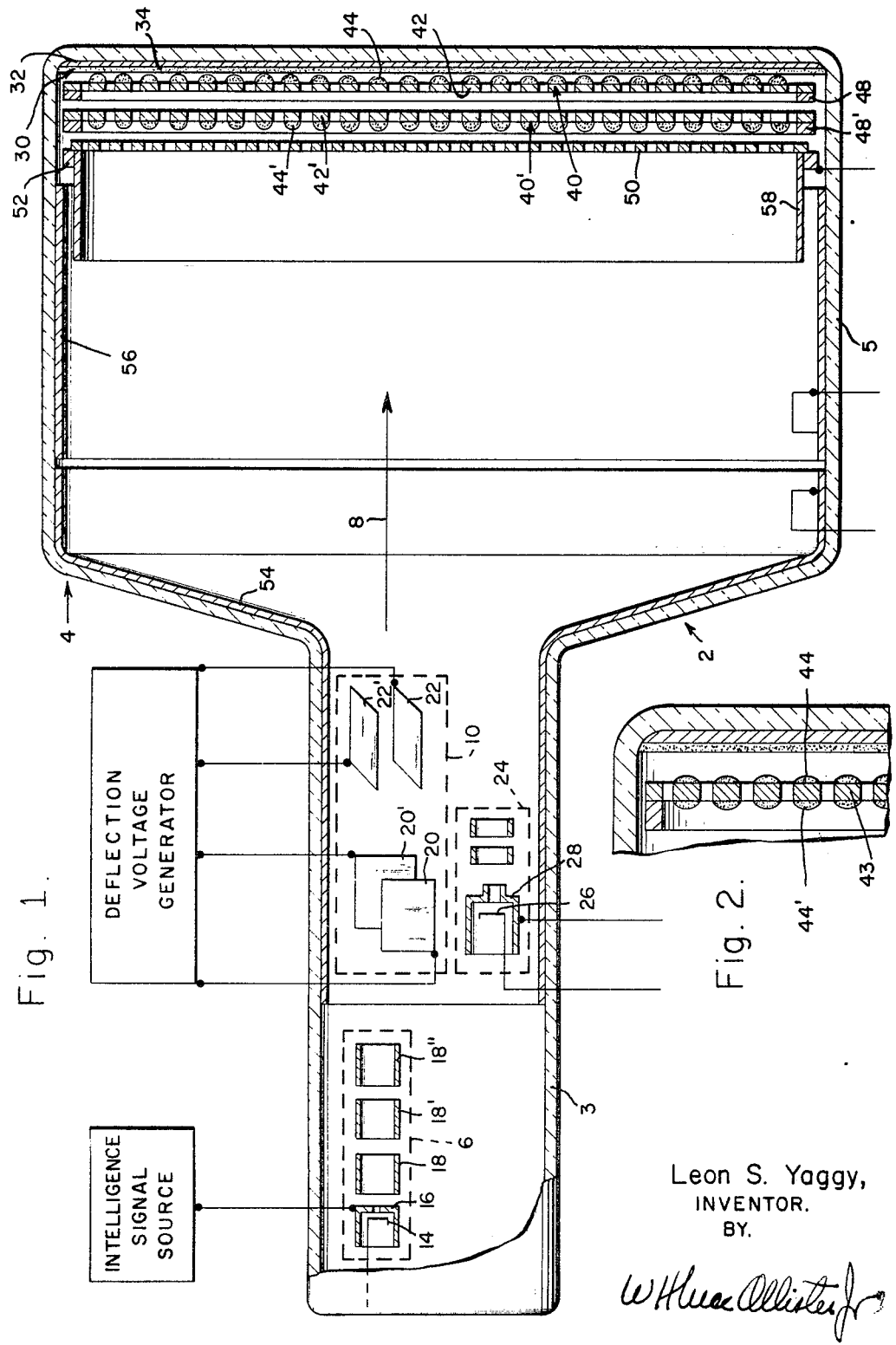
Leon S. Yaggy,
INVENTOR.
BY.
ATTORNEY.

United States Patent Office 3,432,717
Patented Mar. 11, 1969

3,432,717
MOVING TARGET VISUAL INDICATOR TUBE
Leon S. Yaggy, North Carlsbad, Calif., assignor to Hughes Aircraft Company, Culver City, Calif., a corporation of Delaware
Filed Feb. 5, 1965, Ser. No. 430,574
U.S. Cl. 315—12     9 Claims
Int. Cl. H01j 29/41

ABSTRACT OF THE DISCLOSURE

A moving target visual indicator tube in which only changing information is displayed utilizing a storage target structure having two storage surfaces, one facing the flood and scanning electron guns and one facing the viewing target, the latter storage surface adapted to become charged by flood electrons so as to cut off the passage thereof.

---

This invention relates to cathode ray tubes of the type providing a stored visual display. More particularly the invention relates to cathode ray tubes of the type wherein changing information is visually displayed in lesser or greater brightness than the brightness of the background or unchanging information display.

This function of providing a distinctive visual display representative of changing input information is of considerable utility in systems for detecting moving targets such as in radar and other radio detection or navigation systems. This function is commonly referred to as "fixed target cancellation"; devices, such as the present invention, for achieving such cancellation or distinctive displays are known as "moving target indicators." While this function is of obvious significance in military operations, it is not restricted thereto and is also useful in such applications as air traffic control systems.

Heretofore, it has been proposed to achieve "fixed target cancellation" by means of devices capable of storing information, in the form of electrical signals and comparing newly obtained information signals with the stored signals to provide an output signal representative of only the changed or changing information and then apply such output signals to a display device such as a cathode ray tube. A suitable device for this purpose is described by the present inventor in a co-pending application entitled "Moving Target Indicator Tube," S.N. 211,536, filed July 23, 1962, now Patent No. 3,218,505, and assigned to the instant assignee. In this system at least two cathode ray tubes, one for storing and comparing, and one for displaying are required as well as the circuitry for performing the necessary operations.

It has also been proposed to provide a moving target indicator tube of the visual display type in which a special viewing screen structure is employed, and such a device is described by the present inventor in a co-pending application entitled "Moving Target Visual Indicator Tube," S.N. 319,095, now Patent No. 3,284,652, filed and assigned to the instant assignee.

It is, therefore, an object of the present invention to provide an improved moving target indicator tube of the visual display type capable of displaying only the changes in information supplied to it.

Another object of the invention to to provide an improved moving target indicator tube which in itself is capable of providing fixed target cancellation and display of changing target information with a minimum of associated circuitry to accomplish these functions.

Yet another object of the invention is to provide an improved moving target indicator tube having an electrical signal input and a stored visual display.

These and other objects and advantages of the invention are realized by providing a direct-viewing storage tube with a storage target structure having two storage surfaces. In a particular embodiment, two separate storage targets may be utilized to provide the two storage surfaces. It will be understood that in such storage tubes a first storage target is utilized to control the passage therethrough of "flood" electrons which blanket or flood this storage target, the penetration of these flood electrons through the first storage target being determined in accordance with an electrostatic charge pattern established on the storage target by means of a scanning electron beam modulated in accordance with information to be stored and displayed. Such operation is well known in the direct-viewing storage tube art and is described in U.S. Patents 2,790,929 to E. E. Herman and G. F. Smith and 3,086,139 to N. H. Lehrer. In order to properly understand the operation of the direct-viewing moving target indicator tube of the present invention is should be kept in mind that the first storage surface which faces the electron guns will be subject to impingement by both a scanning electron beam and penetration by flood electrons. The second storage surface is subject only to impingement and penetration by flood electrons which pass through the first storage surface. In operation, the first storage target potential may be slightly negative with respect to the cathode of the flood electron gun so that, normally, few flood electrons can pass therethrough. The second storage target may be at a potential slightly positive with respect to the flood gun cathode. Now, when the first storage target is scanned by the scanning electron gun (hereinafter referred to as the "writing" gun) in accordance with information to be displayed, portions of the first storage target will be driven positive by the phenomenon of secondary electron emission from the dielectric material disposed on the surface thereof. Hence, more flood electrons may now penetrate through these portions of the first storage target and likewise through the corresponding portions of the second storage target. Some of these penetrating flood electrons are caused to land on corresponding portions of the second storage target, in a manner described in greater detail hereinafter, to charge these portions negatively until an equilibrium condition is reached whereat few flood electrons can pass through these portions of the second storage target. Hence, display areas corresponding to such portions which represent unchanging information will assume a common low light output level independent of the information storage on the first storage target. Now, if there is an information change, either more or less flood electrons will penetrate through the first storage target as well as the second storage target until an equilibrium is reached again. Hence, corresponding display areas, where information changes, will either grow lighter or darker than display areas representing unchanging information.

The invention will be described in greater detail by reference to the drawings in which:

FIGURE 1 is a cross-sectional elevational view of a cathode ray tube embodying the invention; and FIGURE 2 is a cross-sectional elevational view of an alternative embodiment of a storage target structure for use in the cathode ray tube shown in FIGURE 1.

Referring now to the drawings, a moving target indicator tube 2 according to the invention is shown comprising an evacuated envelope 4 having a neck portion 3 and an enlarged cylindrical portion 5. Disposed in the neck portion 3 is an electron gun assembly 6 for forming an electron beam 8 of elemental cross-sectional area and a deflection system 10 for deflecting the beam 8 horizontally and vertically. The electron gun assembly 6, hereinafter called the "writing" gun, comprises a cathode 14, a control or intensity grid 16, and beam focusing and accelerating electrodes 18, 18' and 18". The gun assembly 6 may be of conventional and well-known design and further detail description of the structure and operation thereof is not deemed necessary herein. While an electrostatic deflection system 10 is shown, this is merely for convenience and an electromagnetic deflection system may be employed to equal advantage as is well understood in the art. The deflection system 10 shown comprises a pair 20, 20' of horizontal deflecting plate and a pair 22, 22' of vertical deflecting plates. The writing gun 6 is adapted to have the electron beam 8 formed thereby to be modulated in accordance with intelligence signals by means of a connection from a source of such signals to the control or intensity grid 16 of the writing gun. The writing beam 8 is also caused to scan a predetermined raster in accordance with deflection voltages applied to the deflection plates 20, 20' and 22, 22'.

Also disposed in the neck portion 3 of the tube envelope is a flood or viewing electron gun 24 for producing a broad beam of electrons. The flood electron gun 24 comprises a cathode 26 and a grid 28. Additional beam-forming electrodes may be included as desired.

Disposed adjacent the faceplate or end portion of the cylindrical portion 5 is a target assembly comprising a viewing target 30, two storage targets 40 and 40', and a collector grid 50. The viewing target 30 comprises a transparent conductive coating 32 and a phosphor coating 34 disposed in the order named on the inner surface of the flat transparent end portion of the cylindrical end section 5. The transparent conductive coating 32 may be a layer of very thin gold or tin oxide, for example, and about $10^{-5}$ inches thick. The phosphor coating 34 may comprise any well-known phosphor material capable of being excited under electron bombardment to produce light.

Adjacent the viewing target 30 is a storage target 40 comprising a screen or mesh member 42 which may be of electro-formed nickel having, for example, about 250 meshes per inch and a thickness of the order of about 0.001". For convenience in describing the operation of the tube of the invention, this storage target 40 is hereinafter referred to as the "second" storage target notwithstanding the fact that in describing the tube structure this target is mentioned first. The outer periphery of the screen 42 may be welded to a support ring 48. A thin layer 44 of secondary electron emissive semi-insulating material is provided on the side of the screen 42 facing the viewing target 30. By the term "semi-insulating" it is intended to mean a material having a resistivity of from about $10^8$ to about $10^{12}$ ohm-cm. This layer 44 of dielectric material constitutes a storage surface and is preferably about 20,000 angstroms thick. Such a storage surface may be provided by evaporating zinc sulfide, for example, onto the nickel screen 42.

Disposed adjacent and co-extensive with the second storage target 40 is a first storage target 40' which may be similar to the second storage target 40 in materials and construction. Thus, the first storage target 40' comprises a screen member 42' and a layer 44' of secondary electron emissive dielectric material; however, the secondary emissive material of the first storage target 40' is a good electrical insulator and is disposed on the side thereof facing the electron guns in the neck portion 3 of the tube. An example of a suitable insulating material for the layer 44 is magnesium fluoride. Typically, the resistivity of the dielectric material of the first storage target may be $10^{14}$ ohm-cm. and higher. The screen member 42' may be welded to a support ring 48'.

Disposed adjacent the first storage target 40' is a collector grid 50 comprising a thin metal screen mounted on a support ring 52. The collector electrode 50 is disposed between the neck portion 3 of the tube and the storage targets 40 and 40'.

Since it is desirable that the flood electrons arrive at the storage targets 40 and 40' at approximately normal incidence thereto, collimation of flood electrons may be effected by means of a collimating lens field produced by lens cylinders 54, 56 and 58. The lens cylinders 54 and 56 are coaxially disposed about the inner surface of the cylindrical portions 3 and 5 of the tube proceeding from the flood electron gun 24 to the collector grid 50. The lens cylinders 54 and 56 may comprise conductive coatings provided, for example, by painting a colloidal suspension of graphite on the inside of the glass envelope. The other collimating lens cylinder 58 may be attached to the inner periphery of the ring 52 which also serves a support the collector grid 50. This lens cylinder 58 extends from the ring 52 towards the flood gun 24 and is overlapped by the right extremity of the lens cylinder 56, as viewed in the drawings.

In operation, the electron beam 8 is caused to scan the first storage target assembly 40' in raster fashion by applying appropriate voltages to the cathode 14 and the electrodes of the electron "writing" gun 6 and to the deflecting plates of the deflection system 10. The bombardment or impingement of the writing beam 8 upon the secondary emissive layer 44' of the first storage target 40' results in the establishment of a stored charge pattern on the storage surface of this storage target 40' by means of the phenomenon of secondary emission. This operation is well known and it is not deemed necessary to describe the same in great detail herein. By maintaining the surface of the storage layer 44' normally negative with respect to the flood gun cathode 26, few or no flood electrons can penetrate the storage target. When the first storage target is scanned by the writing beam 8, which is intensity-modulated in accordance with information-representative signals, the storage surface becomes less negative by the phenomenon of secondary electron emission, the secondary electrons produced by impingement of the writing beam 8 on the storage material 44' being collected by the collector electrode 50. Hence, an over-all charge pattern corresponding to the information is obtained and this charge pattern controls the passage of flood electrons from the viewing electron gun 24 to the viewing target 30 through the second storage target 40. It should be understood that the potentials capable of being stored range from a uniformly negative "black" value to a uniformly positive "white" value; at intermediate potentials only a portion of the flood electrons pass through the first storage target 40' to the viewing target thereby producing intermediate or half-tone shades. It will also be understood that the more positive the potential of stored charges, the more flood electrons per unit area that can pass through the first storage target, and in this manner the flood electron current to the viewing target 30 is controlled in accordance with information to be displayed.

By means of a connection to the transparent conductive electrode 32, the viewing target may be initially maintained at a potential of about 3000 volts positive with respect to the flood gun 24. As the flood electrons penetrate the storage targets 40 and 40' and strike the phosphor layer 34 of the viewing target 30, light will be produced at a brightness level corresponding to the intensity of the flood electrons impinging thereon in accordance with the storage pattern on the first storage target 40'. However, by maintaining a potential on the storage mesh 42 of the second storage target 40 slightly positive with respect to the cathode 26 of the viewing flood electron gun 24, some of the flood electrons penetrating therethrough will be caused to impinge on the second storage surface or layer 44 thereof and will begin to charge this target in a negative direction. The charging of the storage surface 44 may be facilitated and controlled by means of negative-going pulses applied on the viewing target of adjustable amplitude and duration, so as to bring the potential of the viewing target below the flood gun cathode potential at regular intervals of time thus causing the flood electrons which pass through the second storage target 40 to be repelled from the viewing target so that numbers of electrons will impinge on the second storage surface or layer 44 proportional to the numbers which pass through both storage targets. It may be advantageous to raise the potential of either or both storage meshes 42 and 42′ a few volts simultaneously with the lowering of the viewing target potential. By the foregoing process, the second storage surface or layer 44 will be charged negatively until an equilibrium condition is reached wherein the number of electrons impinging on second storage surface or layer 44 is equalled by the number of electrons passing through the storage layer 44 to the storage mesh 42 by virtue of conduction caused by the increased voltage across the storage layer 44. Hence, fixed or unchanging display areas corresponding to these portions of the storage targets will decay in brightness from an initial level and either fade or fall to some fixed low brightness level. Now, if the flood electron current is further reduced due to a change in signal information, the low brightness level display areas will become darker than nonchanging information displays since the equilibrium potential on the dielectric layer or storage surface 44 will be already negative enough to cut off these flood electrons and eventually a new equilibrium potential will be established on the dielectric layer 44. If now the target information changes, for example, so that some areas of the display should become lighter than before, more flood electron current will flow to the respective areas of the storage target 40 and more flood electrons will penetrate therethrough until a new equilibrium condition is established. Hence, as long as target information changes, it will be displayed at an appropriate brightness level and all fixed or unchanging information will be displayed at a common low level brightness.

Since in the moving target indicator direct-view storage tube of the invention there will be a continuous flow of information into the tube, steps may be taken to avoid a continuous increase in the potential of the storage surface 44′ to a saturated value on all parts of the first storage target 40′. A simple expedient is to discharge the storage surface or layer 44′ between scans thereof by the writing beam 8 so that for unchanged information the potential of the storage surface 44′ in a given area is the same after one scan as it was after the previous scan. This may be achieved by applying a train of positive-going pulses to the storage mesh 42′ so that the flood electrons continually drive the potential on the mesh 42′ in the negative direction so as to balance the positive charging thereof by secondary emission. Another method of discharging the first storage target 40′ between scans is by utilizing a storage target such as shown and described in U.S. Patent 3,086,139 to N. H. Lehrer. Such a storage target may be charged positively by a phenomenon of secondary emission by being scanned by a writing beam of a given beam energy and discharged negatively by bombardment induced conductivity by being scanned by a writing beam at a different beam energy. Since it is desirable to permit a continuous flow of information into the tube, two writing guns to provide two scanning beams of different energy levels may be utilized, one for scanning the first storage target 40′ according to incoming information signals and the other for charging the storage target 40′ in the opposite direction.

It will be appreciated that it is possible to further simplify the storage target structure shown in FIGURE 1 in the interest of ease and economy of fabrication by utilizing only one storage grid or mesh member as shown in FIGURE 2. Thus, the dielectric storage layer 44′ of the aforementioned first storage target 40′ may be disposed on the surface of a grid 43 so as to face the electron grids in the neck portion 3 of the tube with the semi-insulating storage layer 44 being disposed on the other side of the grid 43 so as to face the viewing target 30. Operation of this embodiment of the invention will be substantially the same as described hereinbefore except that the pulses which were described as being applied independently in the embodiment of FIGURE 1 to the separate storage targets, must be combined and applied to the single storage target in a manner of somewhat less advantage than in the two-target arrangement. This may be achieved by applying the pulses to the electrode member 43 in a sequential manner, for example.

There thus has been described a novel moving target indicator tube capable of directly displaying only the changes in information supplied to it.

What is claimed is:

1. A moving target direct-viewing indicator tube comprising an evacuated envelope containing:
   (A) first electron gun means for forming a scanning beam of electrons;
   (B) second electron gun means for forming a flood beam of electrons;
   (C) a viewing screen adapted to luminesce in response to impingement thereof by said flood beam electrons;
   (D) a storage target structure disposed between and spaced from said viewing screen and said first and second electron gun means and having first and second storage surfaces facing, respectively, said first and second electron gun means and said viewing screen.

2. A moving target direct-viewing indicator tube comprising an evacuated envelope containing:
   (A) first electron gun means for forming a scanning beam of electrons;
   (B) second electron gun means for forming a flood beam of electrons;
   (C) a viewing screen adapted to luminesce in response to impingement thereof by said flood beam electrons;
   (D) a first storage target disposed between and spaced from said viewing screen and said first and second electron gun means and having a storage surface on the side thereof facing said first and second electron gun means;
   (E) and a second storage target disposed between said first storage target and said viewing screen and having a storage surface on the side thereof facing said viewing screen.

3. A moving target direct-viewing indicator tube comprising an evacuated envelope containing:
   (A) first electron gun means for forming a scanning beam of electrons;
   (B) second electron gun means for forming a flood beam of electrons;
   (C) a viewing screen adapted to luminesce in response to impingement thereof by said flood beam of electrons;
   (D) a first storage target disposed between and spaced from said viewing screen and said first and second electron gun means and having a layer of dielectric material on the side thereof facing said first and second electron gun means capable of having an electrical charge pattern formed thereon by secondary electron emission in response to bombardment thereof by said scanning beam of electrons;
   (E) and a second storage target disposed between said viewing screen and said first storage target and having a layer of semi-insulating material disposed on the side thereof facing said viewing screen capable of having an electrical charge pattern formed thereon by secondary electron emission in response to bombardment thereof by said flood beam of electrons.

4. The invention according to claim 3 wherein means for collecting secondary electrons emitted from said dielectric layer on said first storage target are disposed between said first storage target and said first electron gun means.

5. A moving target direct-viewing indicator tube comprising an evacuated envelope containing:
   (A) first electron gun means for forming a scanning beam of electrons;

(B) second electron gun means for forming a flood beam of electrons;

(C) a viewing screen adapted to luminesce in response to impingement thereof by said flood beam of electrons;

(D) a storage target structure disposed between and spaced from said viewing screen and said first and second electron gun means and having a layer of dielectric material thereon facing said first and second electron gun means and being capable of having an electrical charge pattern formed thereon by bombardment induced conductivity in response to bombardment thereof by said scanning beam of electrons, and a layer of semi-insulating material disposed thereon facing said viewing screen and being capable of having an electrical charge pattern formed thereon by second electron emission in response to bombardment thereof by said flood beam of electrons.

6. The invention according to claim 5 including means for periodically applying a potential to said viewing screen to cause flood electrons to impinge on said layer of semi-insulating material.

7. A moving target direct-viewing indicator tube comprising an evacuated envelope including a faceplate portion and containing:

(A) a viewing screen disposed on said faceplate portion;

(B) a first storage target disposed adjacent said viewing screen and including a metallic mesh member having a layer of semi-insulating material disposed on a surface thereof facing said viewing target, said semi-insulating layer being capable of having an electrical charge pattern formed thereon in response to electron bombardment thereof;

(C) a second storage target disposed adjacent said first storage target including a metallic mesh member having a layer of dielectric material disposed on a surface thereof opposite to the surface facing said first storage target, said dielectric layer being capable of having an electrical charge pattern formed thereon in response to electron bombardment thereof;

(D) first electron gun means for forming a scanning beam of electrons and disposed on the side of said second storage target having said layer of dielectric material thereon;

(E) and second electron gun means for forming a flood beam of electrons and disposed on the side of said second storage target having said layer of dielectric material thereon.

8. The invention according to claim 7 including means for periodically applying potentials to said second storage target to cause said flood electrons to impinge on said layer of dielectric material.

9. The invention according to claim 7 including means for periodically applying potential to said viewing screen for causing said flood electrons to impinge on said semi-insulating layer, and means for periodically applying potentials to said second storage target for causing said flood electrons to periodically impinge on said dielectric material.

References Cited

UNITED STATES PATENTS

| | | | |
|---|---|---|---|
| 2,806,174 | 9/1957 | Pensak | 315—12 |
| 3,165,664 | 1/1965 | Callick | 315—12 |
| 3,331,983 | 7/1967 | Hesse | 315—12 |

RICHARD A. FARLEY, *Primary Examiner.*

JEFFREY P. MORRIS, *Assistant Examiner.*